(12) United States Patent
Lee et al.

(10) Patent No.: US 12,063,968 B2
(45) Date of Patent: Aug. 20, 2024

(54) AEROSOL GENERATING DEVICE

(71) Applicant: KT&G CORPORATION, Daejeon (KR)

(72) Inventors: Seung Won Lee, Gwangmyeong-si (KR); Yong Hwan Kim, Anyang-si (KR); Sung Wook Yoon, Suwon-si (KR); Dae Nam Han, Seoul (KR)

(73) Assignee: KT&G CORPORATION, Daejeon (KR)

( * ) Notice: Subject to any disclaimer, the term of this patent is extended or adjusted under 35 U.S.C. 154(b) by 518 days.

(21) Appl. No.: 17/421,435

(22) PCT Filed: Dec. 10, 2020

(86) PCT No.: PCT/KR2020/018028
§ 371 (c)(1),
(2) Date: Jul. 8, 2021

(87) PCT Pub. No.: WO2021/141249
PCT Pub. Date: Jul. 15, 2021

(65) Prior Publication Data
US 2022/0369712 A1    Nov. 24, 2022

(30) Foreign Application Priority Data
Jan. 6, 2020    (KR) .................. 10-2020-0001569

(51) Int. Cl.
*A24F 40/46*    (2020.01)
*A24F 40/50*    (2020.01)
*A24F 40/90*    (2020.01)

(52) U.S. Cl.
CPC .............. *A24F 40/46* (2020.01); *A24F 40/50* (2020.01); *A24F 40/90* (2020.01)

(58) Field of Classification Search
CPC ........... A24F 40/46; A24F 40/90; A24F 40/50
(Continued)

(56) References Cited

U.S. PATENT DOCUMENTS 6,161,388 A    12/2000  Ghoshal
10,667,329 B2*  5/2020  Bernauer ............. H05B 1/0291
(Continued)

FOREIGN PATENT DOCUMENTS

CN    106132222 A    11/2016
CN    107407941 A    11/2017
(Continued)

OTHER PUBLICATIONS

Extended European Search Report Dated Jan. 24, 2022 in European Application No. 20908462.3.
(Continued)

*Primary Examiner* — Abdullah A Riyami
*Assistant Examiner* — Vladimir Imas
(74) *Attorney, Agent, or Firm* — Sughrue Mion, PLLC

(57) ABSTRACT

An aerosol generating device includes: a heater configured to heat an aerosol generating substance; a battery configured to supply power to the heater; a thermoelectric element arranged adjacent to the heater, and configured to absorb heat from the heater and convert the absorbed heat into electric power; and a controller configured to charge the battery by using the converted power based on a heating time of the heater.

15 Claims, 7 Drawing Sheets

(58) Field of Classification Search
USPC ........................................................ 131/329
See application file for complete search history.

(56) References Cited

U.S. PATENT DOCUMENTS

| | | | |
|---|---|---|---|
| 11,272,578 B2* | 3/2022 | Robert | H05B 3/44 |
| 11,330,843 B2* | 5/2022 | Bergstrom | A24F 40/485 |
| 11,678,409 B2* | 6/2023 | Antonopoulos | H01R 24/52 |
| | | | 219/541 |
| 2017/0360103 A1 | 12/2017 | Li et al. | |
| 2018/0020728 A1 | 1/2018 | Alarcon et al. | |
| 2018/0084608 A1 | 3/2018 | Bernauer et al. | |
| 2018/0206557 A1 | 7/2018 | Peleg et al. | |
| 2019/0252888 A1 | 8/2019 | Holzherr | |
| 2019/0269174 A1* | 9/2019 | Robert | H05B 3/04 |
| 2019/0342950 A1* | 11/2019 | Bernauer | A24F 40/50 |
| 2020/0154772 A1 | 5/2020 | Lim et al. | |
| 2020/0337369 A1* | 10/2020 | Emmett | A24F 1/32 |
| 2020/0352231 A1 | 11/2020 | Han et al. | |
| 2021/0106046 A1 | 4/2021 | Courbat et al. | |

FOREIGN PATENT DOCUMENTS

| | | |
|---|---|---|
| CN | 109123797 A | 1/2019 |
| CN | 110520004 A | 11/2019 |
| EP | 2 701 268 A1 | 2/2014 |
| JP | 2007-159310 A | 6/2007 |
| JP | 2008-182878 A | 8/2008 |
| JP | 2019-535242 A | 12/2019 |
| KR | 10-2000-0054406 A | 9/2000 |
| KR | 10-0368087 B1 | 1/2003 |
| KR | 10-0373289 B1 | 2/2003 |
| KR | 10-2016-0091840 A | 8/2016 |
| KR | 10-2017-0020576 A | 2/2017 |
| KR | 10-2018-0070439 A | 6/2018 |
| KR | 10-2018-0095378 A | 8/2018 |
| KR | 10-2019-0038183 A | 4/2019 |
| KR | 10-2019-0078638 A | 7/2019 |
| WO | 2015/100361 A1 | 7/2015 |
| WO | 2018/091627 A1 | 5/2018 |
| WO | 2018/234792 A1 | 12/2018 |
| WO | 2019/002329 A1 | 1/2019 |
| WO | 2019/115464 A1 | 6/2019 |
| WO | 2019/197170 A1 | 10/2019 |

OTHER PUBLICATIONS

Office Action issued Aug. 30, 2022 in Japanese Application No. 2021-541561.
Communication dated Aug. 2, 2021 by the Korean Patent Office in Korean Application No. 10-2020-0001569.
International Search Report of PCT/KR2020/018028 dated Jun. 7, 2021 [PCT/ISA/210].
Written Opinion of PCT/KR2020/018028 dated Jun. 7, 2021 [PCT/ISA/237].
Chinese Office Action dated Mar. 31, 2023 in Chinese Application No. 202080013508.9.

* cited by examiner

[Fig. 1]
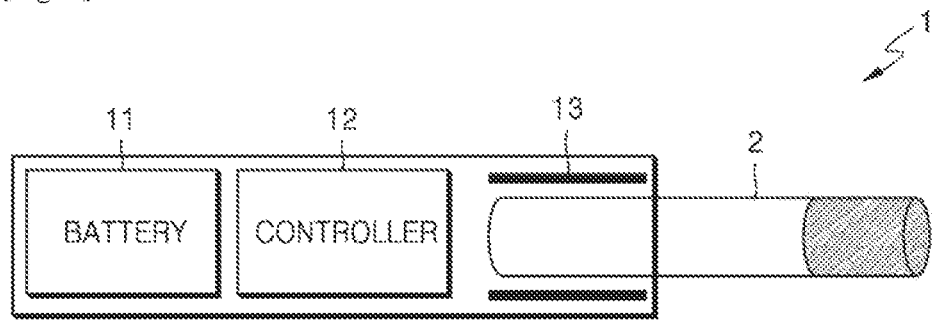
[Fig. 2]
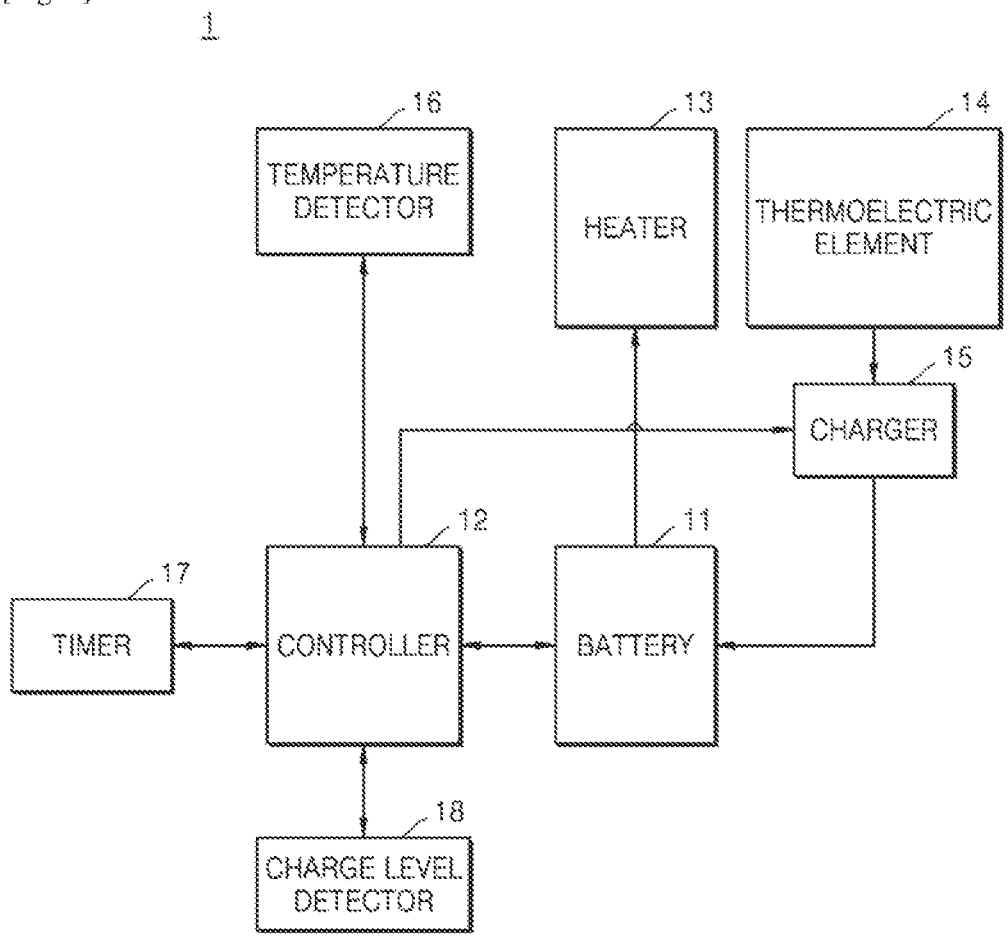

[Fig. 3]
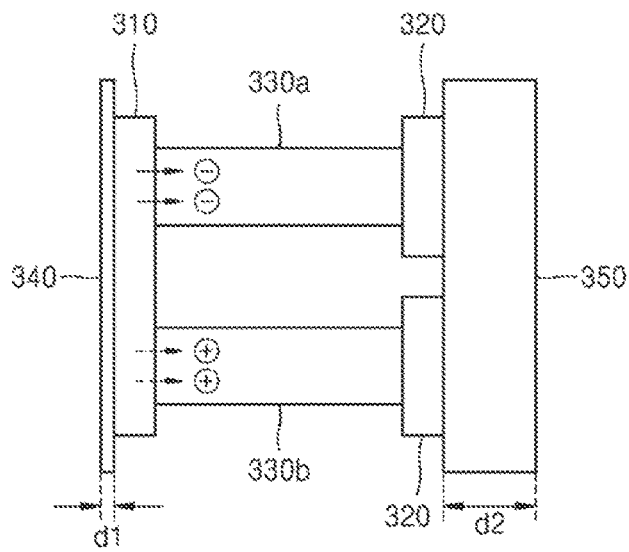
[Fig. 4]
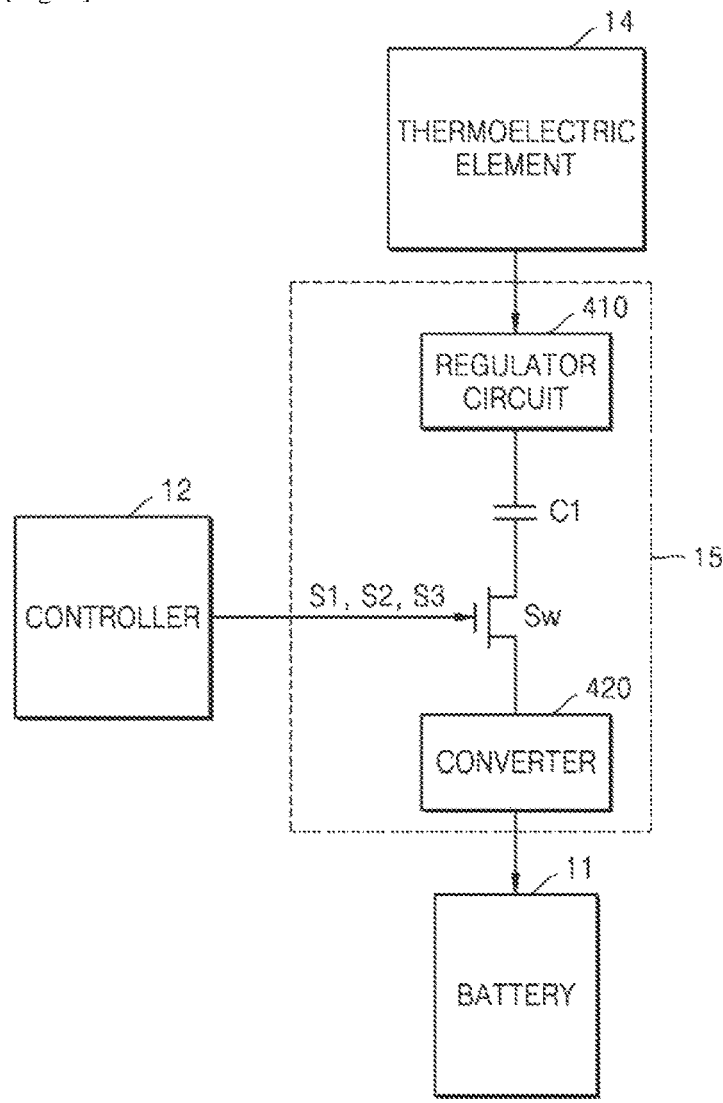

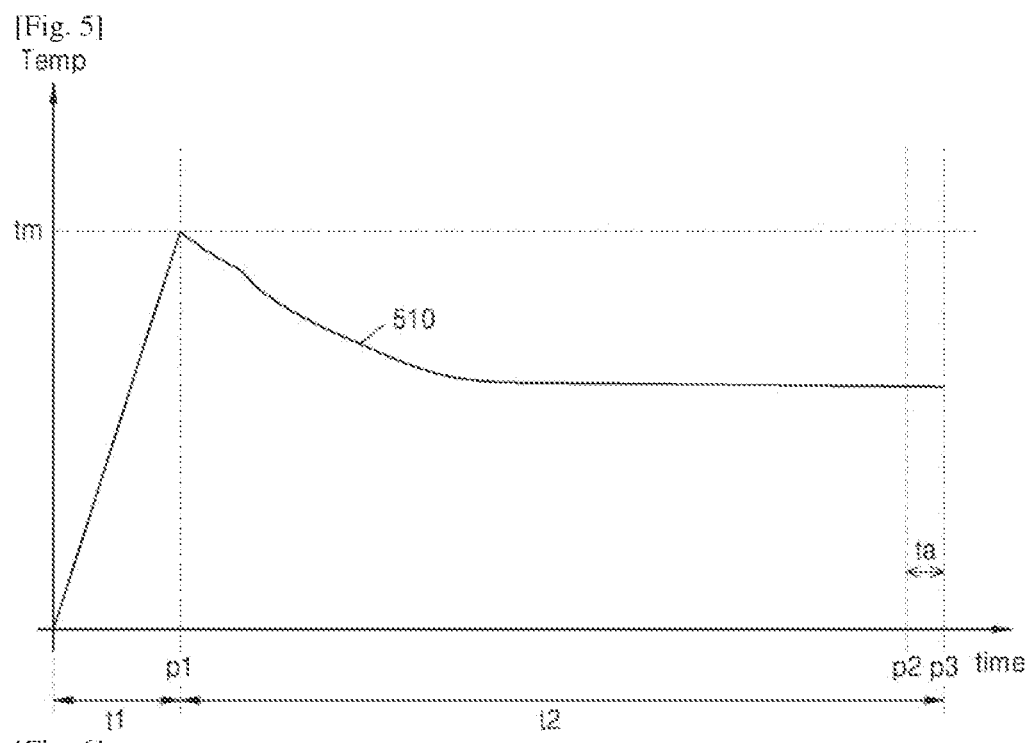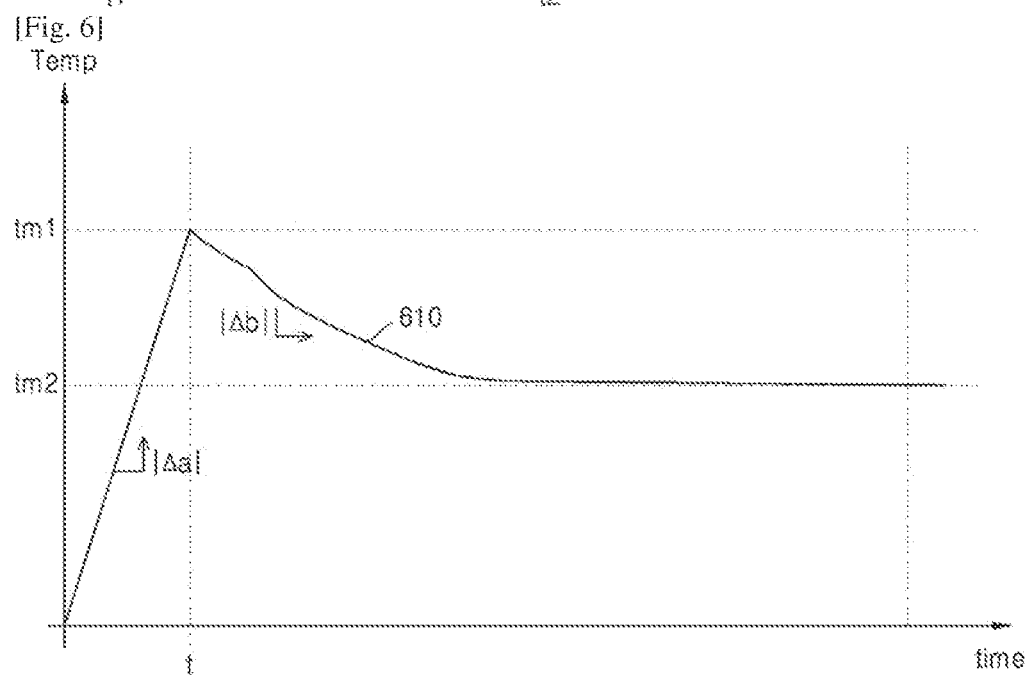

[Fig. 7]
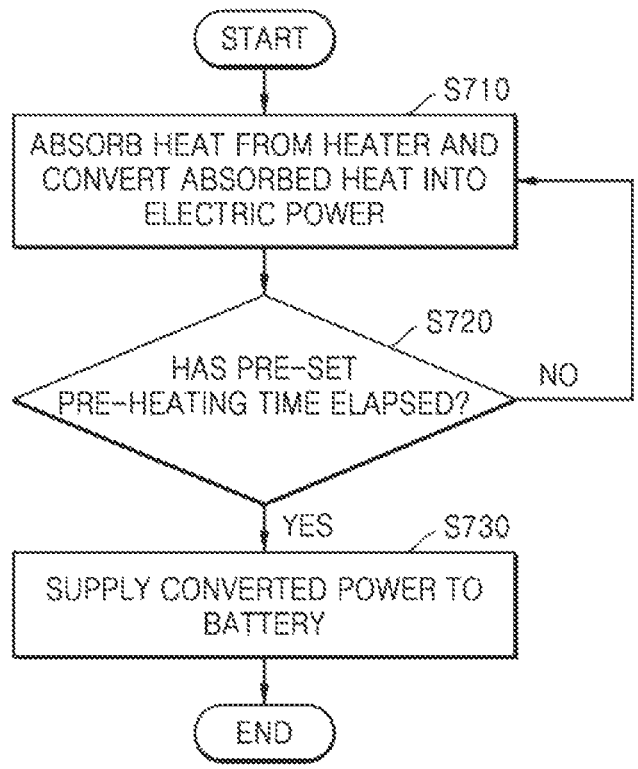
[Fig. 8]
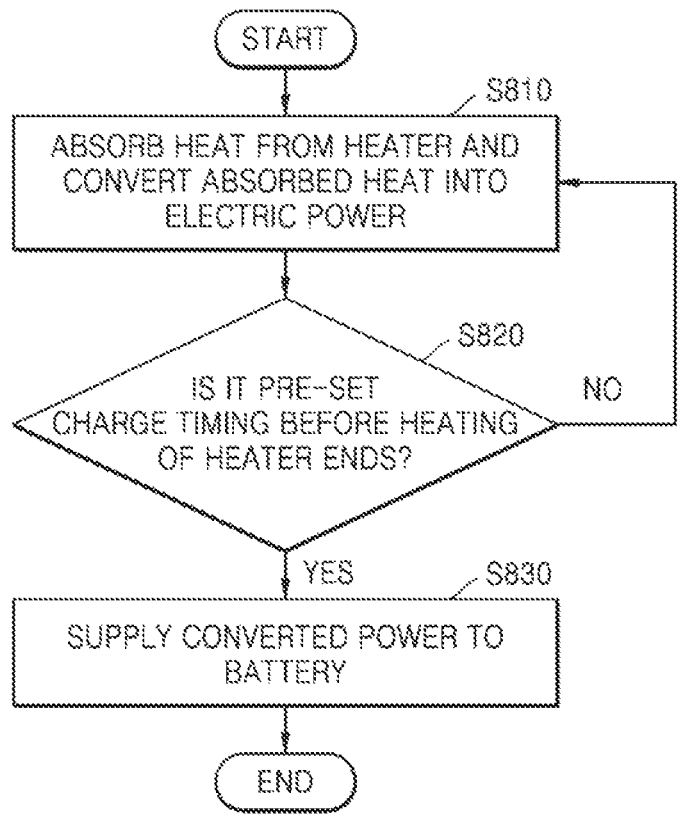

[Fig. 9]
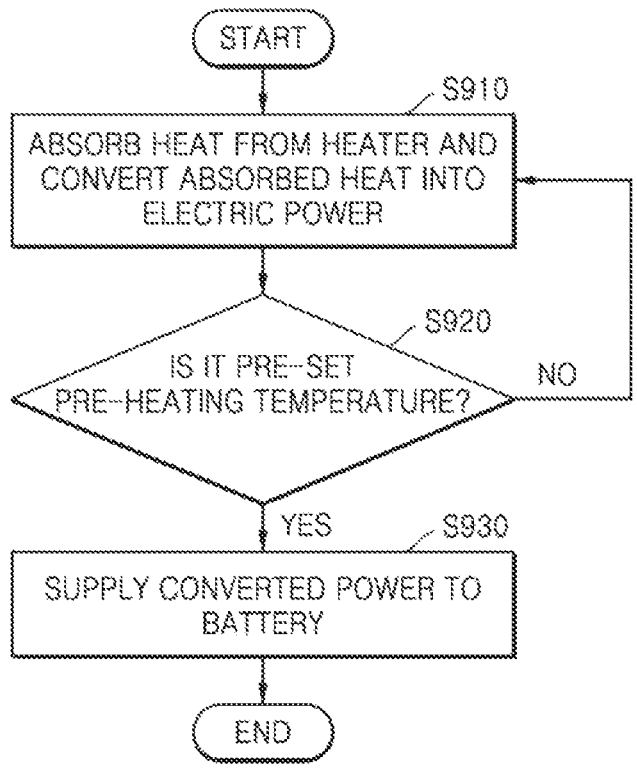
[Fig. 10]
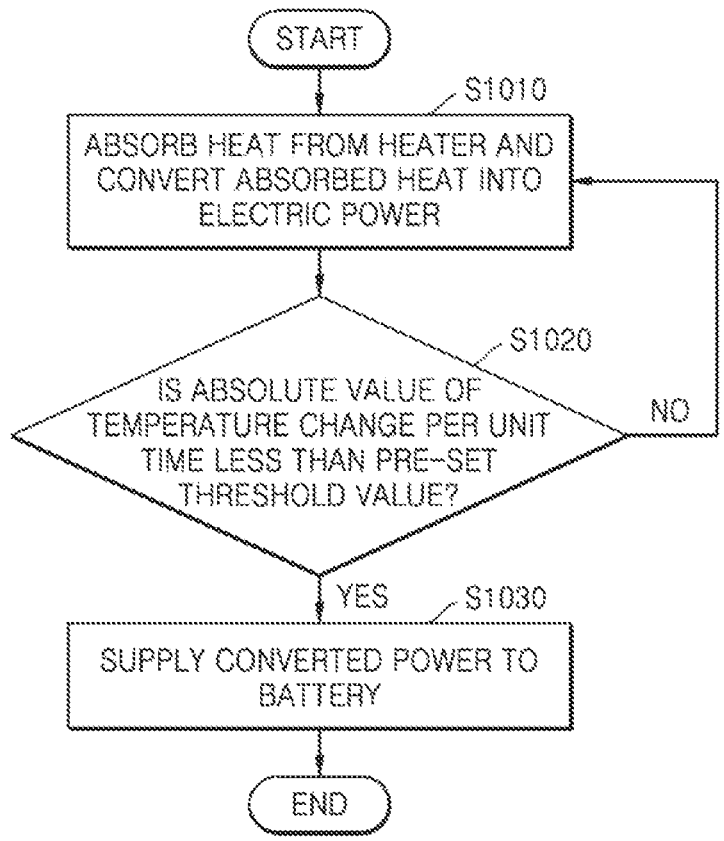

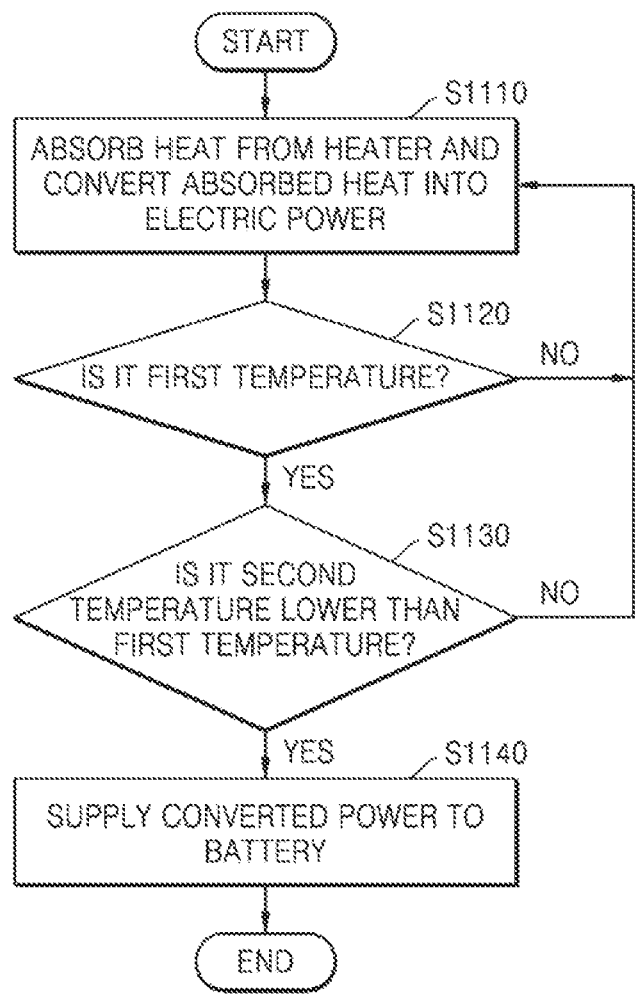
[Fig. 11]

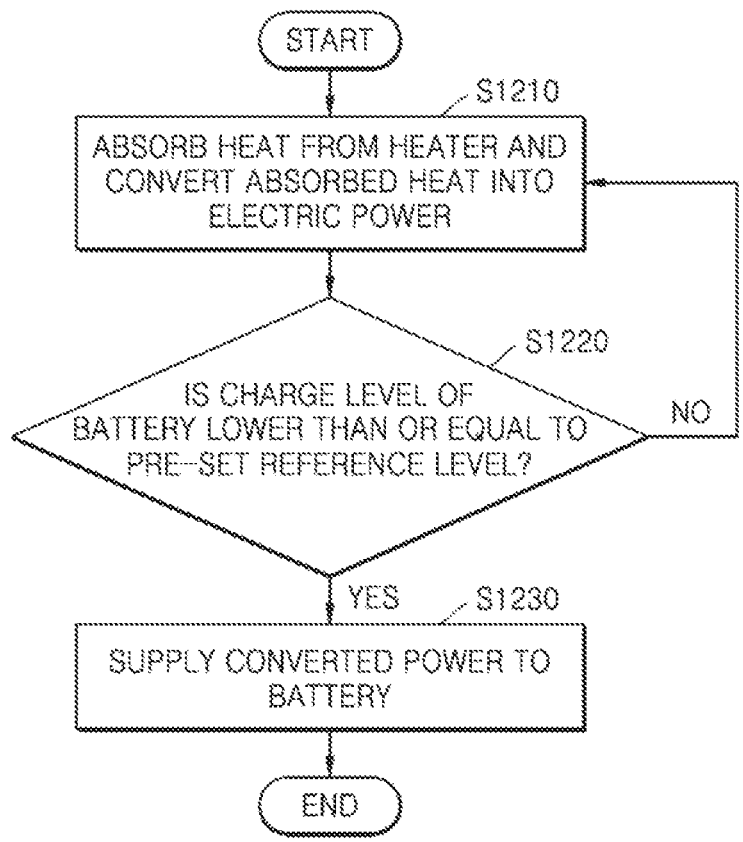
[Fig. 12]

AEROSOL GENERATING DEVICE

CROSS REFERENCE TO RELATED APPLICATIONS

This application is a National Stage of International Application No. PCT/KR2020/018028 filed on Dec. 10, 2020, claiming priority based on Korean Patent Application No. 10-2020-0001569 filed on Jan. 6, 2020.

TECHNICAL FIELD

One or more embodiments relate to an aerosol generating device, and more particularly, to an aerosol generating device capable of charging a battery using heat of a heater.

BACKGROUND ART

Recently, the demand for alternatives to traditional cigarettes has increased. For example, there is growing demand for an aerosol generating device that generates aerosols by heating an aerosol generating material in cigarettes or liquid storages rather than by combusting cigarettes.

Since such aerosol generating devices consume a lot of power during heating of a heater, a technology capable of maximizing energy efficiency is demanded.

DISCLOSURE OF INVENTION

Technical Problem

One or more embodiments provide an aerosol generating device capable of maximizing energy efficiency by using the heat of a heater.

The technical problems of the present disclosure are not limited to the above-described description, and other technical problems may be derived from the embodiments to be described hereinafter.

Solution to Problem

According to one or more embodiments, an aerosol generating device includes a heater configured to heat an aerosol generating substance; a battery configured to supply power to the heater; a thermoelectric element provided adjacent to the heater and configured to absorb heat from the heater and convert the absorbed heat into electric power; and a controller configured to charge the battery by using the converted power based on a heating time of the heater.

Advantageous Effects of Invention

An aerosol generating device according to one or more embodiments may maximize energy efficiency by charging a battery by using heat generated when a heater is heated.

Also, since a cooling member included in a thermoelectric element shields or dissipates heat generated inside the aerosol generating device, the aerosol generating device may protect a user from heat burn when the user uses the aerosol generating device.

The effects of one or more embodiments are not limited by the contents exemplified above, and more various effects are included in the present specification.

BRIEF DESCRIPTION OF DRAWINGS

FIG. 1 is a diagram illustrating an example in which a cigarette is inserted into an aerosol generating device.

FIG. 2 is an internal block diagram of an aerosol generating device according to one or more embodiments.

FIG. 3 is a diagram for describing the thermoelectric element in FIG. 2.

FIG. 4 is a circuit diagram of the charger in FIG. 2.

FIG. 5 is a diagram for describing a method of supplying power based on a heating time of a heater.

FIG. 6 is a diagram for describing a method of supplying power based on a heating temperature of a heater.

FIG. 7 is a flowchart of a method of supplying power based on a heating time of a heater.

FIG. 8 is a flowchart of a method of supplying power based on a heating end timing of a heater.

FIG. 9 is a flowchart for a method of supplying power based on a heating temperature of a heater.

FIG. 10 is a flowchart of a method of supplying power based on a temperature change of a heater per unit time.

FIG. 11 is a flowchart for a method of supplying power based on a reached temperature of a heater.

FIG. 12 is a flowchart of a method of supplying power based on a charge level of a battery.

BEST MODE FOR CARRYING OUT THE INVENTION

According to one or more embodiments, an aerosol generating device may include a heater configured to heat an aerosol generating substance; a battery configured to supply power to the heater; a thermoelectric element arranged adjacent to the heater and configured to absorb heat from the heater and convert the absorbed heat into electric power; and a controller configured to charge the battery by using the converted power based on a heating time of the heater.

Also, the controller may start supplying the converted power to the battery when a pre-set pre-heating time has elapsed.

Also, the controller may start supplying the converted power to the battery when a pre-set time is left before heating of the heater ends.

Also, the aerosol generating device may further include a timer configured to count the heating time of the heater.

According to one or more embodiments, an aerosol generating device may include a heater configured to heat an aerosol generating substance; a battery configured to supply power to the heater; a thermoelectric element arranged adjacent to the heater and configured to absorb heat from the heater and convert the absorbed heat into electric power; and a controller configured to charge the battery by using the converted power based on a heating temperature of the heater.

Also, the controller may start supplying the converted power to the battery when the temperature of the heater reaches a pre-set pre-heating temperature.

Also, the controller may start supplying the converted power to the battery when the absolute value of a temperature change of the heater per unit time is less than a pre-set threshold value.

Also, the controller may start supplying the converted power to the battery when the temperature of the heater reaches a second temperature lower than a first temperature after the temperature of the heater has reached the first temperature.

Also, the aerosol generating device may further include a temperature detector configured to detect the temperature of the heater.

According to one or more embodiments, an aerosol generating device may include a heater configured to heat an aerosol generating substance; a battery configured to supply power to the heater; a thermoelectric element, which includes a first electrode arranged adjacent to the heater, a second electrode arranged apart from the first electrode, and a thermo-electric material arranged between the first electrode and the second electrode and is configured to generate power by using a Fermi level difference between the first electrode and the second electrode caused by an electric field generated as electrons or holes excited by heat from the heater move from the first electrode to the second electrode; and a controller configured to charge the battery by using the power.

Also, the thermoelectric element may further include a cooler connected to the second electrode and configured to cool heat generated by the second electrode.

Also, the thermoelectric element may further include a heat absorber connected to the first electrode and configured to absorb heat generated by the heater and transfer the heat to the first electrode.

Also, the aerosol generating device may further include a capacitor element connected to the thermoelectric element and configured to store the power; and a switching element connected to the capacitor element in series and configured to be turned on and off under a control of the controller.

Also, the controller controls on/off of the switching element based on at least one of a heating time of the heater, a heating temperature of the heater, and a charge level of the battery.

Also, the aerosol generating device further includes a regulator circuit connected between the thermoelectric element and the capacitor element and configured to stabilize a current output from the thermoelectric element.

Mode for the Invention

With respect to the terms in the various embodiments of the present disclosure, the general terms which are currently and widely used are selected in consideration of functions of structural elements in the various embodiments of the present disclosure. However, meanings of the terms may be changed according to intention, a judicial precedent, appearance of a new technology, and the like. In addition, in certain cases, there is also a term arbitrarily selected by the applicant, in which case the meaning will be described in detail in the description of one or more embodiments. Therefore, the terms used in one or more embodiments should be defined based on the meanings of the terms and the general contents of one or more embodiments, rather than simply the names of the terms.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, exemplary embodiments of one or more embodiments will be described in detail with reference to the accompanying drawings. However, an aerosol generating device and an aerosol generating system of the present disclosure may be implemented in various different forms and are not limited to the embodiments described herein.

Hereinafter, embodiments of one or more embodiments will be described in detail with reference to the drawings.

FIG. 1 is a diagram showing examples in which a cigarette is inserted into an aerosol generating device.

Referring to FIG. 1, the aerosol generating device 1 may include a battery 11, a controller 12, and a heater 13. Also, the cigarette 2 may be inserted into an inner space of the aerosol generating device 1.

FIG. 1 illustrate components of the aerosol generating device 1, which are related to the present embodiment. Therefore, it will be understood by one of ordinary skill in the art related to the present embodiment that other general-purpose components may be further included in the aerosol generating device 1, in addition to the components illustrated in FIGS. 1 through 3.

FIG. 1 illustrates that the battery 11, the controller 12, and the heater 13 are arranged in series. However, the internal structure of the aerosol generating device 1 is not limited to the structures illustrated in FIG. 1. In other words, according to the design of the aerosol generating device 1, the battery 11, the controller 12 and the heater 13 may be differently arranged.

When the cigarette 2 is inserted into the aerosol generating device 1, the aerosol generating device 1 may operate the heater 13 to generate an aerosol. The aerosol generated by the heater 13 is delivered to a user by passing through the cigarette 2.

As necessary, even when the cigarette 2 is not inserted into the aerosol generating device 1, the aerosol generating device 1 may heat the heater 13.

The battery 11 may supply power to be used for the aerosol generating device 1 to operate. For example, the battery 11 may supply power to heat the heater 13 and may supply power for operating the controller 12. Also, the battery 11 may supply power for operations of a display, a sensor, a motor, etc. mounted in the aerosol generating device 1.

The controller 12 may generally control operations of the aerosol generating device 1. In detail, the controller 12 may control not only operations of the battery 11, and the heater 13 but also operations of other components included in the aerosol generating device 1. Also, the controller 12 may check a state of each of the components of the aerosol generating device 1 to determine whether or not the aerosol generating device 1 is able to operate.

The controller 12 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heater 13 may be heated by the power supplied from the battery 11. For example, when the cigarette 2 is inserted into the aerosol generating device 1, the heater 13 may be located outside the cigarette 2. Thus, the heated heater 13 may increase a temperature of an aerosol generating material in the cigarette 2.

The heater 13 may include an electro-resistive heater. For example, the heater 13 may include an electrically conductive track, and the heater 13 may be heated when currents flow through the electrically conductive track. However, the heater 13 is not limited to the example described above and may include all heaters which may be heated to a desired temperature. Here, the desired temperature may be pre-set in the aerosol generating device 1 or may be set as a temperature desired by a user.

As another example, the heater 13 may include an induction heater. In detail, the heater 13 may include an electrically conductive coil for heating a cigarette in an induction heating method, and the cigarette may include a susceptor which may be heated by the induction heater.

For example, the heater 13 may include a tube-type heating element, a plate-type heating element, a needle-type heating element, or a rod-type heating element, and may heat the inside or the outside of the cigarette 2, according to the shape of the heating element.

Also, the aerosol generating device 1 may include a plurality of heaters 13. Here, the plurality of heaters 13 may be inserted into the cigarette 2 or may be arranged outside the cigarette 2. Also, some of the plurality of heaters 13 may be inserted into the cigarette 2 and the others may be arranged outside the cigarette 2. In addition, the shape of the heater 13 is not limited to the shapes illustrated in FIG. 1 and may include various shapes.

Although not illustrated in FIGS, the aerosol generating device 1 and an additional cradle may form together a system. For example, the cradle may be used to charge the battery 11 of the aerosol generating device 1. Alternatively, the heater 13 may be heated when the cradle and the aerosol generating device 1 are coupled to each other.

The cigarette 2 may be similar as a general combustive cigarette. For example, the cigarette 2 may be divided into a first portion including an aerosol generating material and a second portion including a filter, etc. Alternatively, the second portion of the cigarette 2 may also include an aerosol generating material. For example, an aerosol generating material made in the form of granules or capsules may be inserted into the second portion.

The entire first portion may be inserted into the aerosol generating device 1, and the second portion may be exposed to the outside. Alternatively, only a portion of the first portion may be inserted into the aerosol generating device 1. Otherwise, the entire first portion and a portion of the second portion may be inserted into the aerosol generating device 1. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 1. For example, the opening and closing and/or a size of the air passage formed in the aerosol generating device 1 may be adjusted by the user. Accordingly, the amount of smoke and a smoking impression may be adjusted by the user. As another example, the external air may flow into the cigarette 2 through at least one hole formed in a surface of the cigarette 2.

FIG. 2 is an internal block diagram of an aerosol generating device according to one or mere embodiments.

Referring to FIG. 2, an aerosol generating device 1 may include a heater 13 for heating an aerosol generating substance, a battery 11 for supplying power to the heater 13, a thermoelectric element 14 for converting heat generated by the heater 13 to electric power, a charger 15 for charging the battery 11 by using converted power, a temperature detector 16 for detecting the temperature of the heater 13, a timer 17 for measuring a heating time of the heater 13, a charge level detector 18 for detecting a charge level of the battery 11, and a controller 12.

Meanwhile, the aerosol generating device 1 may further include additional components other than the components shown in FIG. 2. For example, the aerosol generating device 1 may further include a display capable of outputting visual information, a motor for outputting tactile information, and a memory for storing information for the operation of the aerosol generating device 1.

The heater 13 may heat the aerosol generating substance. When power is applied to the heater 13, heat is generated by a specific resistance. When the aerosol generating substance is heated by the heater 13, an aerosol may be generated. The heater 13 may be a component corresponding to the heater 13 of FIG. 1. Also, the aerosol generating substance may be the cigarette 2 of FIG. 1.

The battery 11 may supply power to the heater 13. The magnitude of power supplied to the heater 13 may be controlled by the controller 12.

The controller 12 may control power supplied to the heater 13 by outputting a pulse width modulation (PWM) signal. To this end, the controller 12 may include a pulse width modulator. The controller 12 may adjust power supplied to the heater 13 by adjusting the duty ratio of an output PWM signal. For example, the controller 12 may increase power supplied to the heater 13 by increasing the duty ratio of a PWM In another example, the controller 12 may reduce power supplied to the heater 13 by reducing the duty ratio of a PWM signal.

The battery 11 may be a rechargeable secondary cell. For example, the battery 11 may be, but is not limited to, a lithium iron phosphate (LiFePO4) battery, an oxide lithium cobalt (LiCoO2) battery, and a lithium titanate battery.

The thermoelectric element 14 may be arranged adjacent to the heater 13, absorb heat generated by the heater 13, and convert absorbed heat into electric power. The thermoelectric element 14 may include a first electrode (310 of FIG. 3) and a second electrode 320, and may generate an electromotive force (or electromotance) based on a temperature difference between the first electrode 310 and the second electrode 320. A method of generating power by the thermoelectric element 14 will be described below in more detail with reference to FIG. 3.

The charger 15 may charge the battery 11 based on power generated by the thermo-electric element 14. The charger 15 may be designed to perform high-speed charging of the battery 11.

The charger 15 may include a regulator circuit (410 of FIG. 4) for stable charging of the battery 11. Also, the charger 15 may include a capacitor element (C1 of FIG. 4) that stores power generated by the thermoelectric element 14. Also, the charger 15 may include a converter 420 that converts power generated by the thermoelectric element 14. According to embodiments, the charger 15 may further include a reverse voltage protection circuit for preventing a reverse voltage.

The charger 15 may store power generated by the thermoelectric element 14 and then supply power to the battery 11 under the control of the controller 12.

The controller 12 may charge the battery 11 by using power generated by the thermo-electric element 14. The controller 12 may charge the battery 11 based on a heating time of the heater 13, a heating temperature of the heater 13, and a charge level of the battery 11. To this end, the aerosol generating device 1 may include the timer 17 for measuring the heating time of the heater 13, the temperature detector 16 for detecting the heating temperature of the heater 13, and the charge level detector 18 for detecting the charge level of the battery 11.

In detail, the controller 12 may charge the battery 11 by using converted power based on the heating time of the heater 13.

For example, the controller 12 may supply the converted power to the battery 11 from a time point at which a pre-set pre-heating time has elapsed. The pre-heating time may be appropriately set in consideration of a temperature at which an aerosol is generated.

In another example, the controller 12 may supply converted power to the battery 11 from a pre-set charge timing before the heating of the heater 13 is completed. The charge timing may be set such that utilization of residual heat generated by the heater 13 may maximized while not affecting aerosol generation.

The controller 12 may charge the battery 11 by using converted power based on t heating temperature of the heater 13.

For example, when the temperature of the heater 13 reaches a pre-set pre-heating temperature, the controller 12 may supply converted power to the battery 11. The pre-heating temperature may be, but is not limited to, 300 degrees.

In another example, when the absolute value of a temperature change of the heater 13 per unit time is less than a pre-set threshold value, the controller 12 may supply converted power to the battery 11. The threshold value may be appropriately set in consideration of stable heating of the heater 13.

In another example, when the temperature of the heater 13 reaches a first temperature and then drops to a second temperature lower than the first temperature, the controller 12 may supply converted power to the battery 11. The first temperature may be the pre-heating temperature, and the second temperature may be the temperature of the heater 13 when heating of the heater 13 ends. However, embodiments are not limited thereto.

The controller 12 may supply power to the battery 11 when the charge level of the battery 11 is less than or equal to a pre-set reference level. For example, the reference level may be, but is not limited to, 30% of the total capacity of the battery 11.

FIG. 3 is a diagram for describing the thermoelectric element of FIG. 2.

Referring to FIG. 3, the thermoelectric element 14 may include the first electrode 310 arranged adjacent to the heater 13, the second electrode 320 arranged apart from the first electrode 310, and thermo-electric materials 330a and 330b (hereinafter denoted by 330 when distinction is not necessary) arranged between the first electrode 310 and the second electrode 320.

According to embodiments, the thermoelectric element 14 may further include a cooler 350 that is connected to the second electrode 320 and cools heat generated by the second electrode 320.

According to embodiments, the thermoelectric element 14 may further include a heat absorber 340 that is connected to the first electrode 310 such that the heat absorber 340 absorbs heat generated by the heater 13 and transfers the heat to the first electrode 310.

The first electrode 310 and the second electrode 320 may include a conductive metal. The first electrode 310 may be arranged adjacent to the heater 13. The second electrode 320 may be arranged apart from the first electrode 310. The second electrode 320 is arranged opposite the heater 13 and may be adjacent to a casing of the aerosol generating device 1.

A thermo-electric material 330 may be arranged between the first electrode 310 and the second electrode 320. One end of the thereto-electric material 330 may be connected to the first electrode 310, and the other end of the thermo-electric material 330 may be connected to the second electrode 320.

The thermo-electric material 330 may include an n-type semiconductor 330a and a P-type semiconductor 330b. For example, the n-type semiconductor 330a may be a semiconductor doped with phosphorus (P), arsenic (As), antimony (Sb), bismuth (Bi), etc. Also, the P-type semiconductor 330b may be a semiconductor doped with boron (B), aluminum (Al), indium (In), gallium (Ga), etc.

The polarity of the first electrode 310 may be determined according to the type of the thermo-electric material 330.

For example, in the case of the n-type semiconductor 330a, electrons may be excited in a region where the first electrode 310 and the n-type semiconductor 330a contact each other. Also, the excited electrons are transferred to the second electrode 320 through a conduction band, and an electric field may be generated according to the movement of the excited electrons. The electric field causes a slope of the Fermi level in the n-type semiconductor 330a, and thus the polarity of the region where the first electrode 310 and the n-type semiconductor 330a contact each other may become positive.

In another example, in the case of the P-type semiconductor 330b, holes may be excited in a region where the first electrode 310 and the P-type semiconductor 330b contact each other. Also, the excited holes are transferred to the second electrode 320 through a conduction band, and an electric field may be generated according to the movement of the excited holes. The electric field causes a slope of the Fermi level in the thermo-electric material 330, and thus the polarity of the region where the first electrode 310 and the p-type semiconductor 330b contact each other may become negative.

The electromotive force between the first electrode 310 and the second electrode 320 generated by the Fermi level difference in the thermo-electric material 330 may be used to charge the battery 11.

Meanwhile, the electromotive force generated by the thermoelectric element 14 may increase in proportion to the temperature difference between the first electrode 310 and the second electrode 320. Therefore, the aerosol generating device 1 according to one or more embodiments may further include the heat absorber 340 connected to the first electrode 310 and the cooler 350 connected to the second electrode 320 to increase the temperature difference between the first electrode 310 and the second electrode 320.

The heat absorber 340 may absorb heat generated by the heater 13 and transfer the heat to the first electrode 310. One side of the heat absorber 340 may be adjacent to the heater 13, and the other side of the heat absorber 340 may be in contact with the first electrode 310.

The cooler 350 may cool heat generated by the second electrode 320. One side of the cooler 350 may be in contact with the second electrode 320. A plurality of protrusions may be formed at the other side of the cooler 350 to increase the contact area with the cooling air.

To maximize the temperature difference between the first electrode 310 and the second electrode 320, a thickness d1 of the heat absorber 340 may be smaller than a thickness d2 of the cooler 350.

The heat absorber 340 and the cooler 350 may include a thermally conductive material. For example, the cooler 350 may include any one of aluminum, carbon steel, and stainless steel, or an alloy selected from the group of the above-stated metals, but one or more embodiments are not limited thereto.

FIG. 4 is a circuit diagram of the charger of FIG. 2.

Referring to FIG. 4, the charger 15 may include a regulator circuit 410 for stabilizing power generated by the thermoelectric element 14, a capacitor element C1 for storing power generated by the thermoelectric element 14, a switching element Sw for controlling supply of power stored in the capacitor element C1, and a converter 420 for changing a voltage supplied to the battery 11.

The regulator circuit 410 may be connected to an output end of the thermoelectric element 14. The regulator circuit 410 may stabilize a current output by the thermo-electric element 14. To this end, the regulator circuit 410 may include a constant current circuit.

The capacitor element C1 may be connected to the regulator circuit 410. The capacitor element C1 may store power corresponding to a current output by the regulator circuit 410. The capacitance of the capacitor element C1 may be set based on the thermoelectric efficiency of the thermoelectric element 14.

The switching element Sw may be connected in series to the capacitor element C1 and may be turned on and off under the control of the controller 12.

In detail, the controller 12 may output at least one control signal from among a first control signal S1, a second control signal S2, and a third control signal S3.

The first control signal S1 may be a control signal based on a heating time of the heater 13. For example, the controller 12 may output the first control signal S1 when a pre-set pre-heating time has elapsed. In another example, the controller 12 may output the first control signal S1 at a pre-set charge timing before the heating of the heater 13 ends.

The second control signal S2 may be a control signal based on a heating temperature of the heater 13. For example, the controller 12 may output the second control signal S2 when the temperature of the heater 13 reaches a pre-set pre-heating temperature. In another example, when the absolute value of a temperature change of the heater 13 per unit time is less than a pre-set threshold value, the controller 12 may output the second control signal S2. In another example, when the temperature of the heater 13 reaches a first temperature and then drops to a second temperature lower than a first temperature, the controller 12 may output the second control signal S2.

The third control signal S3 may be a control signal based on a charge level of the battery 11. For example, the controller 12 may output the third control signal S3 when the charge level of the battery 11 is less than or equal to a pre-set reference level.

The switching element Sw may be turned on when at least one of the first control signal S1, the second control signal S2, and the third control signal S3 is received. When the switching element Sw is turned on, power stored in the capacitor element C1 may be provided to the battery 11.

The converter 420 may change a voltage supplied to the battery 11. The converter 420 may boost or decrease a voltage stored in the capacitor element C1. For example, the converter 420 may boost or decrease the voltage stored in the capacitor element C1 to 3.5V, but one or more embodiments are not limited thereto. The converter 420 may supply a changed voltage to the battery 11.

The battery 11 may be charged by using a voltage output by the converter 420.

FIG. 5 is a diagram for describing a method of supplying power based on a heating time of a heater.

Referring to FIG. 5, a graph 510 shows temperature changes of the heater 13 according to the heating time of the heater 13. As shown in FIG. 5, the controller 12 rapidly supplies power to the heater 13 during a pre-set pre-heating time t1 and, after the pre-heating time t1, supplies power to maintain the temperature of the heater 13 at a temperature suitable for generating an aerosol during a pre-set smoking time t2. For example, the pre-heating time t1 may be 40 seconds, and the smoking time t2 may be 4 minutes. However, one or more embodiments are not limited thereto. The pre-heating time t1 and the smoking time t2 may be set in consideration of the vaporization temperature of an aerosol generating substance, the power of the battery 11, and the performance of the heater 13.

The controller 12 may supply converted power to the heater 13 based on the heating time of the heater 13.

For example, the controller 12 may supply the converted power to the battery 11 from a timing p1 at which the pre-set pre-heating time t1 has elapsed. This is because the thermoelectric element 14 requires the temperature of the heater 13 to be equal to or above a temperature sufficient to excite electrons and holes. Also, given that a lot of power is required within a short period of time during the pre-heating time t1, the output power of the battery 11 may be prevented from becoming unstable due to power provided by the thermoelectric element 14 by supplying the converted power to the battery 11 from a timing p1.

In another example, the controller 12 may supply converted power to the battery 11 from a pre-set charge timing p2 before the heating of the heater 13 is completed. The charge timing p2 may be a pre-set time ta ahead of a heating end timing p3 and may be set to be adjacent to the heating end timing p3. The pre-set time to may be, but is not limited to, 2 seconds. The reason for this is to prevent a temperature profile of the heater 13 from being changed by charging of the battery 11 during the smoking time t2 as much as possible and to maximize energy efficiency by charging the battery 11 by using residual heat generated when the heating of the heater 13 ends, since the temperature of the heater 13 needs to be precisely maintained during the smoking time t2 so as to provide a constant flavor to a user.

FIG. 6 is a diagram for describing a method of supplying power based on a heating temperature of a heater.

Referring to FIG. 6, a temperature profile 610 of the heater 13 is shown. As shown in FIG. 6, by controlling power supplied to the heater 13, the controller 12 may rapidly increase the temperature of the heater 13 to a pre-set pre-heating temperature tm1. Then, the controller 12 may reduce the temperature of the heater 13 to a smoking temperature tm2, which is an appropriate temperature for generating an aerosol. Also, when the temperature of the heater 13 reaches the smoking temperature tm2, the controller 12 may maintain the smoking temperature tm2 until the heating ends. For example, the pre-heating temperature tint may be 300 degrees, and the smoking temperature tm2 may be 250 degrees. However, one or more embodiments are not limited thereto. The pre-heating temperature tm1 and the smoking temperature tm2 may be set in consideration of the vaporization temperature of an aerosol generating substance, the power of the battery 11, and the performance of the heater 13.

The controller 12 may supply converted power to the heater 13 based on the heating temperature of the heater 13.

For example, when the temperature of the heater 13 reaches the pre-set pre-heating temperature tm1, the controller 12 may supply converted power to the battery 11. When the charge timing of the battery 11 is controlled based on the pre-heating temperature tm1 rather than the pre-heating time t1, insufficient pre-heating of the heater 13 due to instability of an output voltage that occurs when the battery 11 is charged may be prevented.

In another example, when the absolute value of a temperature change of the heater 13 per unit time is less than a pre-set threshold value, the controller 12 may supply converted power to the battery 11. A significant temperature change per unit time indicates a significant change of the output voltage supplied front the battery 11 to the heater 13. Therefore, when the battery 11 is charged while the temperature change of the heater 13 per unit time is being significant, the output voltage may become more unstable. For example, a threshold value may be identical to absolute value $\Delta |a|$ of the temperature change of the heater 13 per unit time in a pre-heating period.

In another example, when the temperature of the heater 13 reaches a first temperature and then drops to a second temperature lower than the first temperature, the controller 12 may supply converted power to the battery 11. The first temperature may be the pre-heating temperature tm1, and the second temperature may be the smoking temperature tm2. By setting the first temperature as the pre-heating temperature, not only is sufficient pre-heating of the heater 13 ensured, but also the charging of the battery 11 is performed in a period in which the fluctuation of the output voltage is small. Therefore, the heater 13 may be controlled more stably.

FIG. 7 is a flowchart of a method of supplying power based on a heating time of a heater.

Referring to FIG. 7, in operation S710, the thermoelectric element 14 may absorb heat from the heater 13 and convert the absorbed heat into electric power.

The thermoelectric element 14 may include the first electrode 310 provided adjacent to the heater 13, the second electrode 320 provided apart from the first electrode 310, and the thermo-electric material 330 provided between the first electrode 310 and the second electrode 320. Also, when the heater 13 is heated, the thermoelectric element 14 may generate power by using a Fermi level difference between the first electrode 310 and the second electrode 320 caused by an electric field generated as excited electrons move from the first electrode 310 to the second electrode 320 and excited holes move from the first electrode 310 to the second electrode 320.

In operation S720, the controller 12 may determine whether the heating time of the heater 13 has exceeded the pre-set pre-heating time. The controller 12 may determine whether the heating time of the heater 13 has exceeded the pre-set pre-heating time based on heating time information regarding the heater 13 provided by the timer 17. For example, the pre-heating time may be, but is not limited to, 40 seconds. The pre-heating time may be set in consideration of the vaporization temperature of an aerosol generating substance, the power of the battery 11, and the performance of the heater 13.

In operation S730, when the heating time of the heater 13 has exceeded the pre-heating time, the controller 12 may supply converted power to the battery 11. The controller 12 may turn on the switching element SW and supply power stored in the capacitor element C1 to the battery 11.

FIG. 8 is a flowchart of a method of supplying power based on a heating end timing of a heater.

Referring to FIG. 8, in operation S810, the thermoelectric element 14 may absorb heat from the heater 13 and convert the absorbed heat into electric power. Operation S810 of FIG. 8 may correspond to operation S710 of FIG. 7.

In operation S820, the controller 12 may determine whether the heating time of the heater reached a pre-set charge timing before the heating of the heater 13 ends. In other words, it is determined whether a pre-set amount of time is left before heating of the heater 13 ends. The controller 12 may determine whether the heating time of the heater 13 has reached the pre-set charge timing based on heating time information regarding the heater 13 provided by the timer 17. The charge timing may be set adjacent to a heating end timing. For example, the charge timing may be 2 seconds before the heating end timing, but is not limited thereto.

In operation S830, the controller 12 may supply converted power to the battery 11 when the heating time of the heater 13 reaches the pre-set charge timing before the heating ends. The controller 12 may turn on the switching element SW and supply power stored in the capacitor element C1 to the battery 11.

FIG. 9 is a flowchart for a method of supplying power based on a heating temperature of a heater.

Referring to FIG. 9, in operation S910, the thermoelectric element 14 may absorb heat from the heater 13 and convert the absorbed heat into electric power. Operation S910 of FIG. 9 may correspond to operation S710 of FIG. 7 and operation S810 of FIG. 8.

In operation S920, the controller 12 may determine whether the heating temperature of the heater 13 has reached a pre-set pre-heating temperature. The controller 12 may determine whether the heating temperature of the heater 13 has reached the pre-set pre-heating temperature based on temperature information regarding the heater 13 provided by the temperature detector 16. For example, the pre-heating temperature may be, but is not limited to, 300 degrees. The pre-heating temperature may be set in consideration of the vaporization temperature of an aerosol generating substance, the power of the battery 11, and the performance of the heater 13.

In operation S930, when the temperature of the heater 13 reaches the pre-set pre-heating temperature, the controller 12 may supply converted power to the battery 11. The controller 12 may turn on the switching element SW and supply power stored in the capacitor element C1 to the battery 11.

FIG. 10 is a flowchart of a method of supplying power based on a temperature change of a heater per unit time.

Referring to FIG. 10, in operation S1010, the thermoelectric element 14 may absorb heat from the heater 13 and convert the absorbed heat into electric power. Operation S1010 of FIG. 10 may correspond to operation S710 of FIG. 7, operation S810 of FIG. 8, and operation S910 of FIG. 9.

In operation S1020, the controller 12 may determine whether the absolute value of the temperature change of the heater 13 per unit time is less than a pre-set threshold value.

The controller 12 may calculate the temperature change of the heater 13 per unit time based on temperature information regarding the heater 13 provided by the temperature detector 16. The threshold value may be identical to the absolute value of the temperature change of the heater 13 per unit time in a pre-heating period. For example, the temperature change of the heater 13 per unit time may be 7.5° C./s, but is not limited thereto.

In operation S1030, when the absolute value of a temperature change of the heater 13 per unit time is less than the pre-set threshold value, the controller 12 may supply converted power to the battery 11. The controller 12 may turn on the switching element SW and supply power stored in the capacitor element C1 to the battery 11.

FIG. 11 is a flowchart for a method of supplying power based on a reached temperature of a heater.

Referring to FIG. 11, in operation S1110, the thermoelectric element 14 may absorb heat from the heater 13 and convert the absorbed heat into electric power. Operation S1110 of FIG. 11 may correspond to operation S710 of FIG. 7, operation S810 of FIG. 8, operation S910 of FIG. 9, and operation S1010 of FIG. 10.

In operation S1120, the controller 12 may determine whether the temperature of the heater 13 has reached a first temperature. The first temperature may be a pre-heating temperature. For example, the first temperature may be, but is not limited to, 300 degrees.

In operation S1130, when the temperature of the heater has reached the first temperature, the controller 12 may consecutively determine whether the temperature of the heater 13 has reached a second temperature lower than the first temperature. The second temperature may be a heat-absorbing temperature. For example, the second temperature may be, but is not limited to, 250 degrees.

In operation S1120 and operation S1130, the controller 12 may determine whether the temperature of the heater 13 has reached the first temperature and the second temperature based on temperature information regarding the heater 13 provided by the temperature detector 16.

In operation S1140, when the temperature of the heater 13 has reached the second temperature, the controller 12 may supply converted power to the battery 11. The controller 12 may turn on the switching element SW and supply power stored in the capacitor element C1 to the battery 11.

FIG. 12 is a flowchart of a method of supplying power based on a charge level of a battery.

Referring to FIG. 12, in operation S1210, the thermoelectric element 14 may absorb heat from the heater 13 and convert the absorbed heat into electric power. Operation S1210 of FIG. 12 may correspond to operation S710 of FIG. 7, operation S810 of FIG. 8, operation S910 of FIG. 9, operation S1010 of FIG. 10, and operation S1110 of FIG. 11.

In operation S1220, the controller 12 may determine whether the charge level of the battery 11 is lower than or equal to a pre-set reference level. The reference level may be, but is not limited to, 30% of the total capacity of the battery 11.

In operation S1230, the controller 12 may supply converted power to the battery 11 when the charge level of the battery 11 is lower than or equal to the pre-set reference level. The controller 12 may turn on the switching element SW and supply power stored in the capacitor element C1 to the battery 11.

The embodiments of the present disclosure may be written as computer programs and can be implemented in general-use digital computers that execute the programs using a computer readable recording medium. In addition, the structure of the data used in the above-described method may be recorded on a computer-readable recording medium through various means. Examples of the computer readable recording medium include magnetic storage media (e.g., ROM, RAM, USB drives, floppy disks, hard disks, etc.), optical recording media (e.g., CD-ROMs, or DVDs), etc.

At least one of the components, elements, modules or units (collectively "components" in this paragraph) represented by a block in the drawings, such as the controller 12, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Those of ordinary skill in the art pertaining to the present embodiments can understand that various changes in form and details can be made therein without departing from the scope of the characteristics described above. The disclosed methods should be considered in a descriptive sense only and not for purposes of limitation. The scope of the present disclosure is defined by the appended claims rather than by the foregoing description, and all differences within the scope of equivalents thereof should be construed as being included in the present disclosure.

The invention claimed is:

1. An aerosol generating device comprising:
   a heater configured to heat an aerosol generating substance;
   a battery configured to supply power to the heater;
   a thermoelectric element arranged adjacent to the heater, and configured to absorb heat from the heater and convert the absorbed heat into electric power;
   a charger configured to store the converted power; and
   a controller configured to control the charger to charge the battery based on a heating time of the heater.

2. The aerosol generating device of claim 1, wherein the controller is further configured to start supplying the converted power to the battery when a pre-set pre-heating time has elapsed.

3. The aerosol generating device of claim 1,
wherein the controller is further configured to start supplying the converted power to the battery from when a pre-set time is left before heating of the heater ends.

4. The aerosol generating device of claim 1, further comprising a timer configured to measure the heating time of the heater.

5. An aerosol generating device comprising:
a heater configured to heat an aerosol generating substance;
a battery configured to supply power to the heater;
a thermoelectric element arranged adjacent to the heater, and configured to absorb heat from the heater and convert the absorbed heat into electric power;
a charger configured to store the converted power; and
a controller configured to control the charger to charge the battery by using the converted power based on a heating temperature of the heater.

6. The aerosol generating device of claim 5,
wherein the controller is further configured to start supplying the converted power to the battery when the temperature of the heater reaches a pre-set pre-heating temperature.

7. The aerosol generating device of claim 5,
wherein the controller is further configured to start supplying the converted power to the battery when an absolute value of a temperature change of the heater per unit time is less than a pre-set threshold value.

8. The aerosol generating device of claim 5,
wherein the controller is further configured to start supplying the converted power to the battery when the temperature of the heater reaches a second temperature lower than a first temperature after the temperature of the heater has reached the first temperature.

9. The aerosol generating device of claim 5,
further comprising a temperature detector configured to detect the temperature of the heater.

10. An aerosol generating device comprising:
a heater configured to heat an aerosol generating substance;
a battery configured to supply power to the heater;
a thermoelectric element comprising:
a first electrode arranged adjacent to the heater;
a second electrode arranged apart from the first electrode; and
a thermoelectric material arranged between the first electrode and the second electrode, and configured to generate power by using a Fermi level difference between the first electrode and the second electrode caused by an electric field generated as electrons or holes excited by heat from the heater move from the first electrode to the second electrode;
a charger configured to store the converted power; and
a controller configured to control the charger to charge the battery based on at least one of a heating time of the heater, a heating temperature of the heater, and a charge level of the battery.

11. The aerosol generating device of claim 10,
wherein the thermoelectric element further comprises a cooler connected to the second electrode and configured to cool the second electrode.

12. The aerosol generating device of claim 10,
wherein the thermoelectric element further comprises a heat absorber connected to the first electrode, and configured to absorb heat generated by the heater and transfer the heat to the first electrode.

13. The aerosol generating device of claim 10, further comprising:
a capacitor element connected to the thermoelectric element, and configured to store the power generated by the thermoelectric element; and
a switching element connected to the capacitor element in series and configured to be turned on and off under control of the controller.

14. The aerosol generating device of claim 13,
wherein the controller is further configured to turn on and off the switching element based on the at least one of the heating time of the heater, the heating temperature of the heater, and the charge level of the battery.

15. The aerosol generating device of claim 13, further comprising
a regulator circuit connected between the thermoelectric element and the capacitor element, and configured to stabilize a current output from the thermoelectric element.

* * * * *